(12) United States Patent
Hayashi

(10) Patent No.: US 7,163,259 B2
(45) Date of Patent: Jan. 16, 2007

(54) VEHICLE BODY FLOOR STRUCTURE

(75) Inventor: Masatomo Hayashi, Tokyo-to (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 94 days.

(21) Appl. No.: 11/099,649

(22) Filed: Apr. 6, 2005

(65) Prior Publication Data
US 2005/0248185 A1 Nov. 10, 2005

(30) Foreign Application Priority Data
May 6, 2004 (JP) .......................... P2004-137198

(51) Int. Cl.
B62J 25/20 (2006.01)
(52) U.S. Cl. ............. 296/204; 296/187.09; 296/187.12
(58) Field of Classification Search ........... 296/193.07, 296/203.01, 203.02, 204, 75, 192, 187.03, 296/187.09, 187.1, 187.12
See application file for complete search history.

(56) References Cited

U.S. PATENT DOCUMENTS

| 4,264,101 | A | * | 4/1981 | Gotoh | .................. 296/203.02 |
| 4,669,776 | A | * | 6/1987 | Harasaki | ................ 296/203.02 |
| 4,669,777 | A | * | 6/1987 | Harasaki et al. | ....... 296/203.02 |
| 4,865,378 | A | * | 9/1989 | Filtri et al. | ............ 296/193.07 |
| 4,892,350 | A | * | 1/1990 | Kijima | ...................... 296/204 |
| 6,364,358 | B1 | | 4/2002 | Miller | |
| 6,364,401 | B1 | * | 4/2002 | Kim | ...................... 296/203.02 |
| 6,382,710 | B1 | * | 5/2002 | Funk et al. | ............. 296/187.12 |
| 6,547,318 | B1 | * | 4/2003 | Takeuchi | .................... 296/204 |
| 6,679,546 | B1 | * | 1/2004 | Mishima et al. | ....... 296/203.01 |
| 7,052,076 | B1 | * | 5/2006 | Kim | ...................... 296/187.09 |
| 2002/0195840 | A1 | * | 12/2002 | Mishima et al. | ....... 296/203.01 |
| 2005/0194818 | A1 | * | 9/2005 | Odaka et al. | .......... 296/187.12 |

FOREIGN PATENT DOCUMENTS

| DE | 102 32 842 A1 | 2/2004 |
| EP | 1 437 291 A2 | 7/2004 |
| EP | 1 439 109 A2 | 7/2004 |
| JP | 58-67569 A | 10/1981 |
| JP | 59-109468 A | 12/1982 |
| JP | 2000-225966 A | 8/2000 |

* cited by examiner

*Primary Examiner*—Dennis H. Pedder
*Assistant Examiner*—Melissa A. Black
(74) *Attorney, Agent, or Firm*—McDermott Will & Emery LLP

(57) ABSTRACT

A vehicle body structure includes a cross member connected to at least one of a pair of side sill inners, extending in a fore and aft direction of a vehicle body at both ends of the cross member in a widthwise direction of the vehicle body, and associated with a lower surface of a front end of a floor panel at an area close proximity to a dash panel to form a closed cross-sectional section extending in the widthwise direction, and a floor reinforce joined to the dash panel, the side sill inner and the cross member at a front corner area surrounded by the dash panel, a front end of the at least one of the side sill inners, and a front wall of the end of the cross member to form a front corner closed cross-sectional section.

10 Claims, 5 Drawing Sheets

VEHICLE BODY FLOOR STRUCTURE

BACKGROUND OF THE INVENTION

The present invention relates to a vehicle body floor structure and, more particularly, to a vehicle body floor structure around an assembled portion, between a front end of a side sill and an end of a dash panel in a vehicle-widthwise direction, of a vehicle body floor section of an automobile.

Japanese Patent Application Laid-open Publication No. 2000-225966 discloses a vehicle body of an automobile with a structure wherein a reinforce member is joined to front ends of side sills, which form a fore and aft oriented frame member on both sides of a floor, to form a closed cross-sectional sections on front outside ends of the side sills (see Page 3 and FIG. 4).

SUMMARY OF THE INVENTION

However, upon studies conducted by the present inventor, such a structure in which the front ends of the side sills are reinforced by the reinforce member is effective in cases where a front wheel is moved backward in a straight direction to be brought into colliding contact with the vehicle body during a frontal collision of the vehicle. In the meanwhile, it is conceived that in cases where the front wheel is moved inward in the vehicle-widthwise direction along an oblique direction thereof to be brought into colliding contact with the vehicle body, the front end of the side sill is caused to deform inward in the vehicle-widthwise direction.

To address such an issue, a need arises for the side sill to have an increased plate thickness or to be made of material with increased strength, causing factors to occur in increase in weight and cost.

The present invention has been completed with the above study in mind conducted by the present inventor and has an object to provide a vehicle body floor structure, additionally provided with a partially formed reinforce, which is able to adequately withstand both a rearward colliding input, applied to a front end of the side sill, and a colliding input applied to the vehicle body in a vehicle-widthwise direction.

To achieve the above object, in one aspect according to the present invention, there is provided a vehicle body floor structure comprising: a cross member connected to at least one of a pair of side sill inners, extending in a fore and aft direction of a vehicle body at both ends of the cross member in a widthwise direction of the vehicle body, and associated with a lower surface of a front end of a floor panel at an area close proximity to a dash panel to form a closed cross-sectional section extending in the widthwise direction; and a floor reinforce joined to the dash panel, the side sill inner and the cross member at a front corner area surrounded by the dash panel, a front end of the at least one of the side sill inners, and a front wall of the end of the cross member to form a front corner closed cross-sectional section.

Other and further features, advantages, and benefits of the present invention will become more apparent from the following description taken in conjunction with the following drawings.

DETAILED DESCRIPTION OF THE PREFERRED EMBODIMENTS

Hereinafter, a vehicle body floor structure of an embodiment according to the present invention is described below with reference to FIGS. 1 to 6. Incidentally, the presently filed embodiment is described taking a structure, in which a cabin body with a vehicle compartment is mounted on a chassis fame, as an example.

Figure 1:
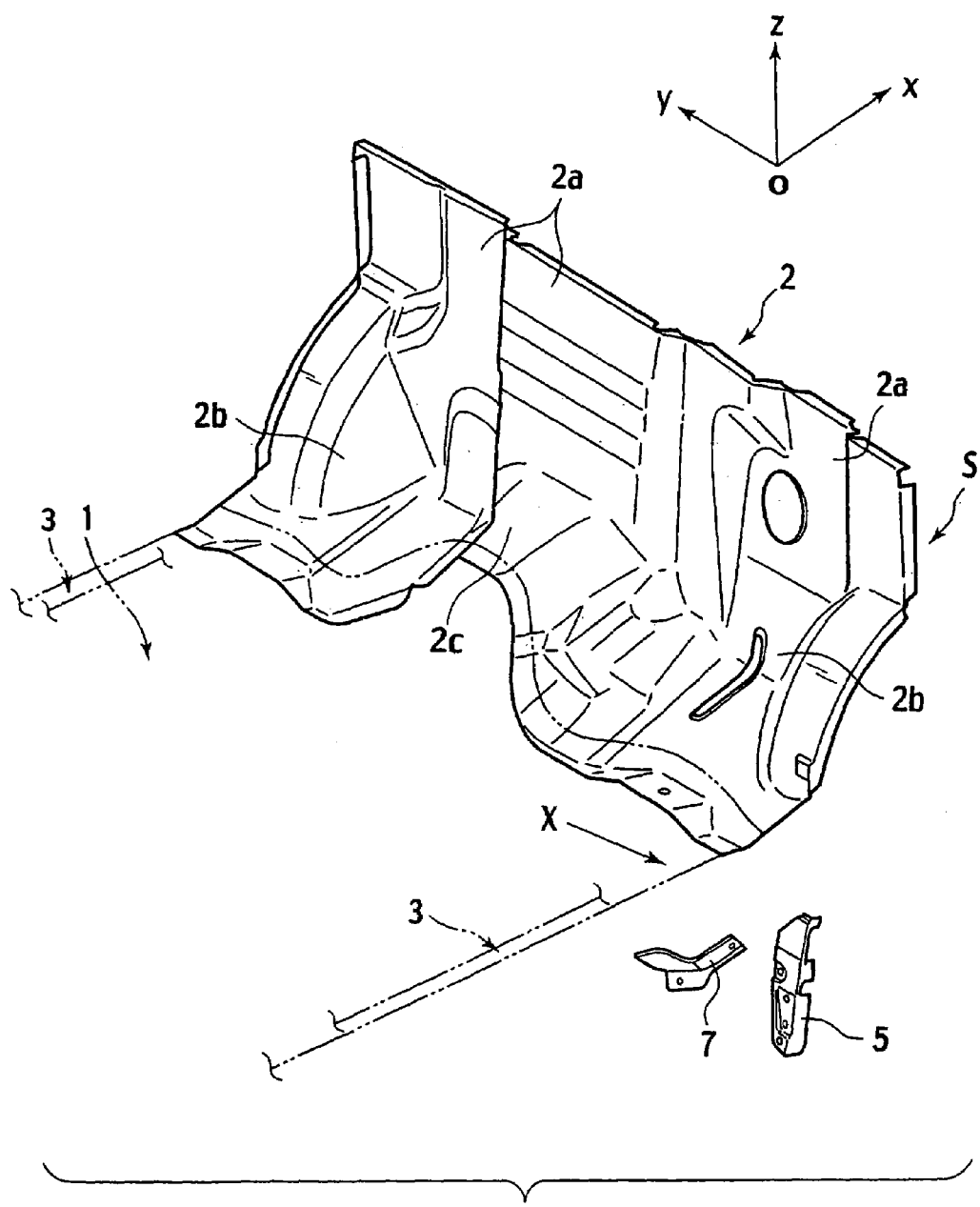
FIG. 1 is a schematic perspective view showing a vehicle body floor structure of an embodiment according to the present invention, under a condition wherein a dash panel, a gusset plate and a bolt plate are exploded, as viewed from a lower side of a vehicle body toward forward and upper side thereof.
Figure 2:
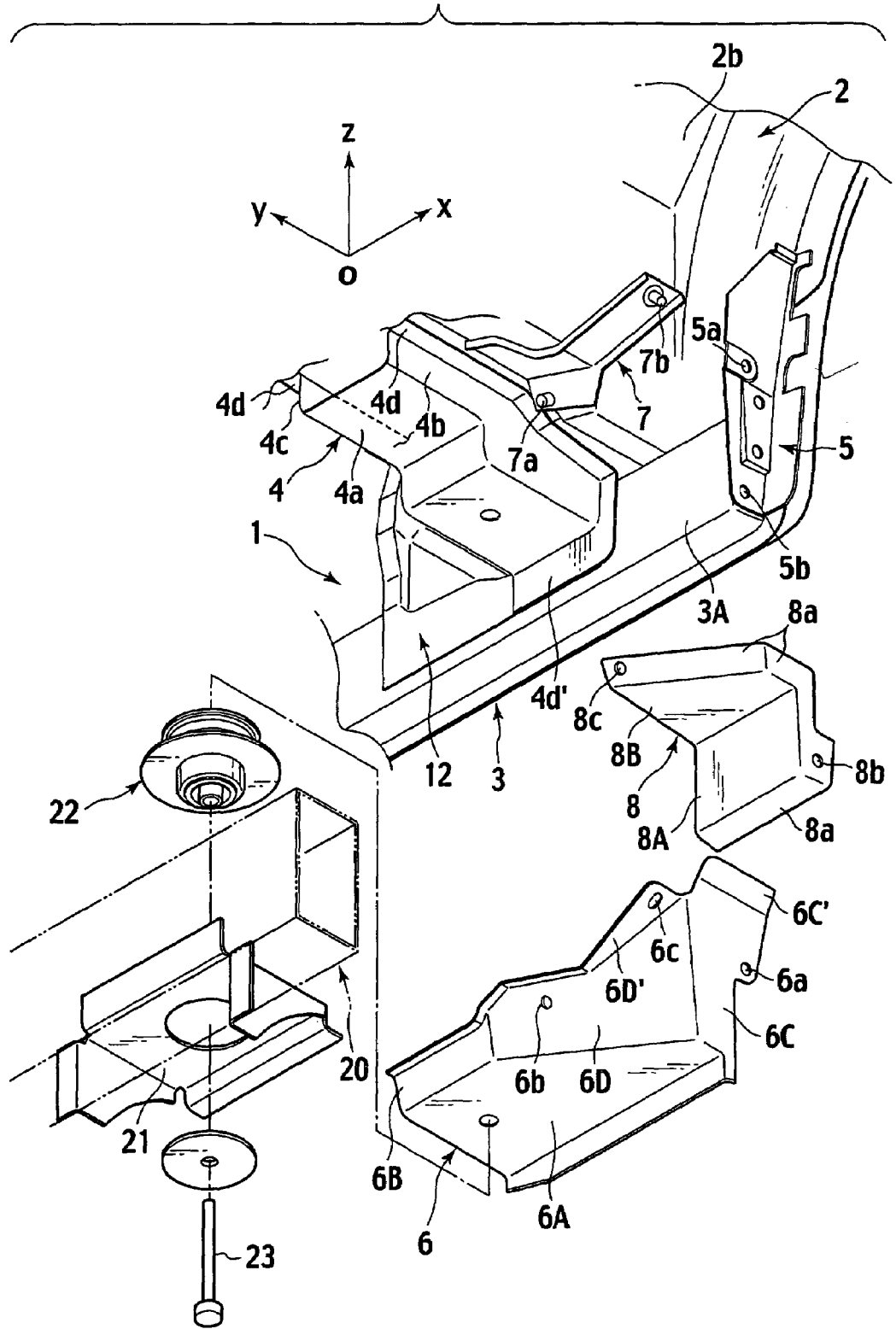
FIG. 2 is a schematic perspective view showing the vehicle body floor structure of the presently filed embodiment, under a condition where a floor reinforce and associated component parts are exploded, with assembled portion mainly between a front end of a side sill inner and a distal end of a cross member, that is, the cross member and associated component parts assembled to the vehicle body being viewed along a direction X, as shown in FIG. 1, which is oriented from an inner and lower side of the vehicle body toward an outer and upper side thereof.
Figure 3:
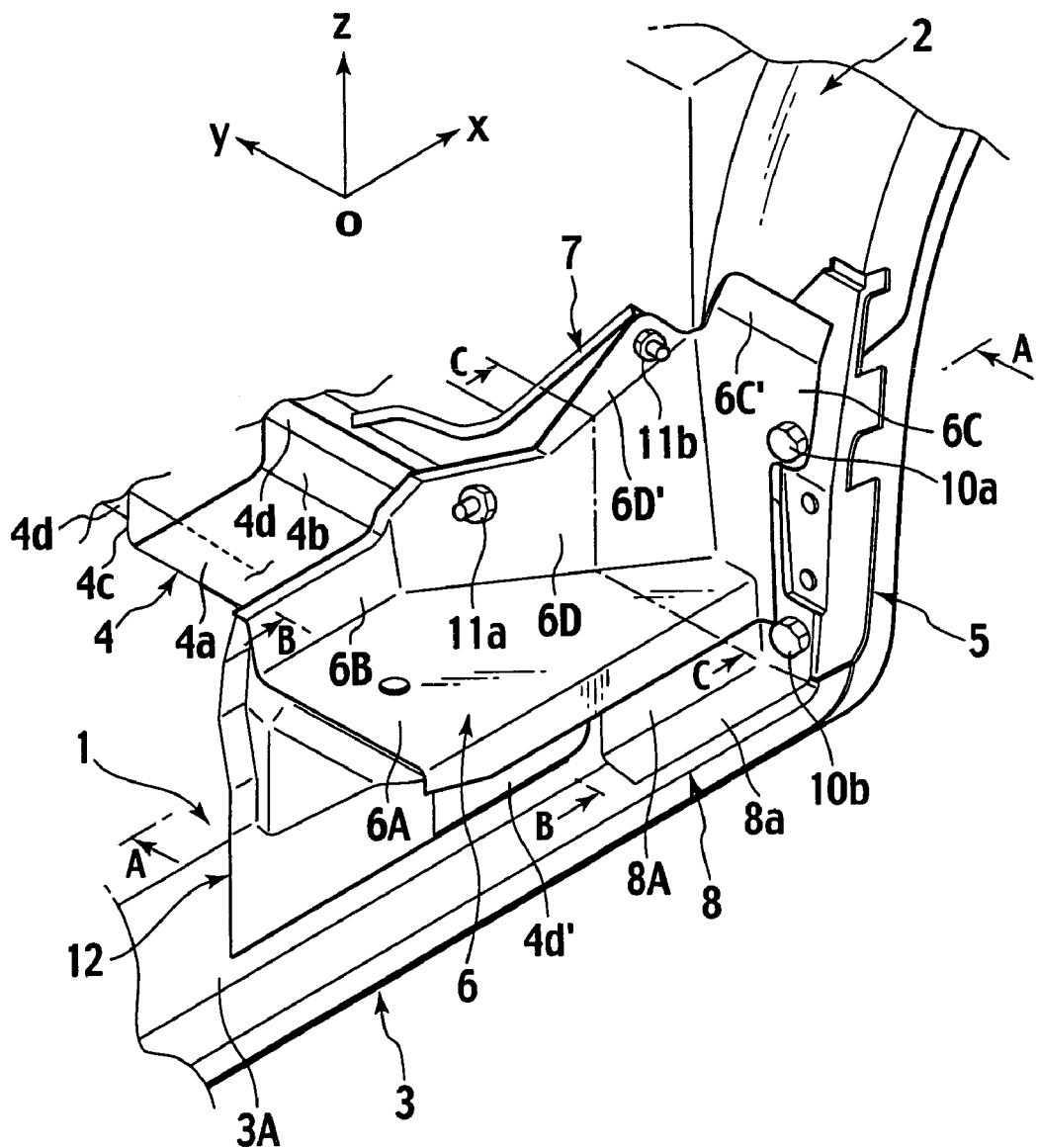
FIG. 3 is a perspective view showing the vehicle body floor structure of the presently filed embodiment in a condition where the floor reinforce and associated component parts, shown in the exploded form in FIG. 2, are assembled.
Figure 4:
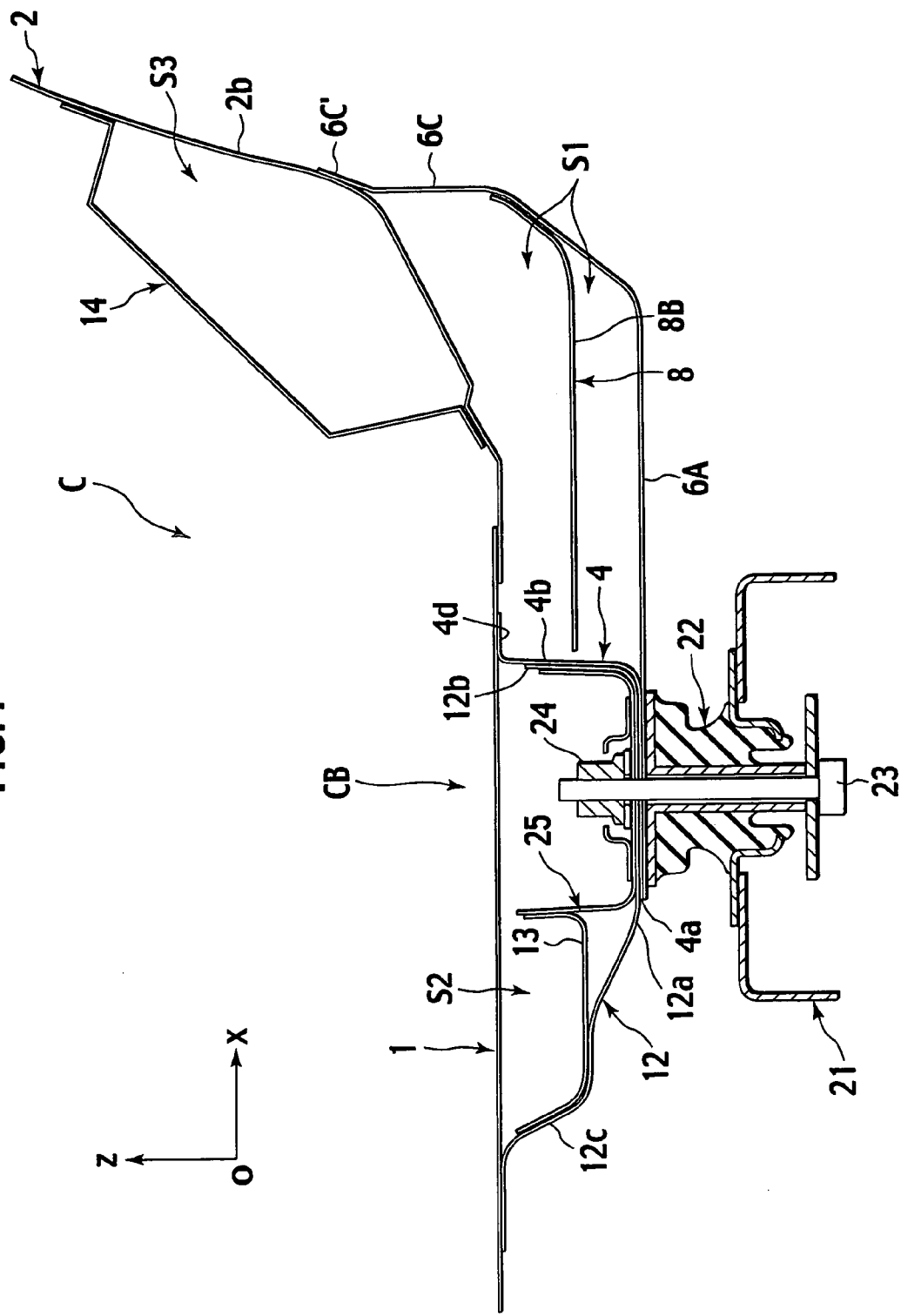
FIG. 4 is a cross-sectional view taken on line A—A of FIG. 3.
Figure 5:
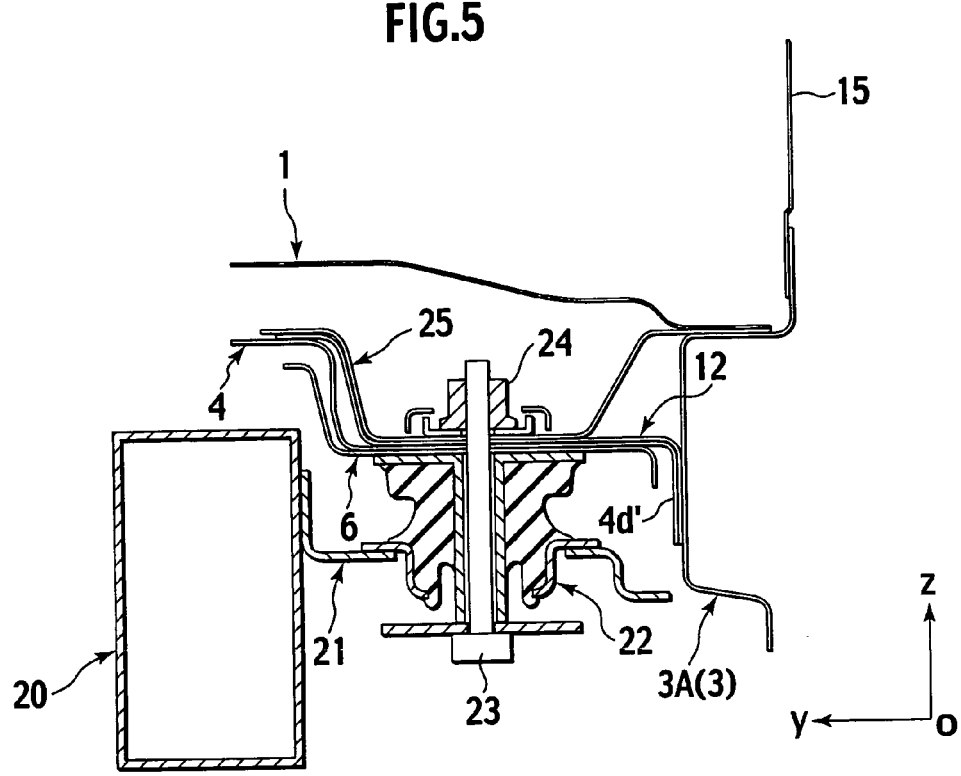
FIG. 5 is a cross-sectional view taken on line B—B of FIG. 3.
Figure 6:
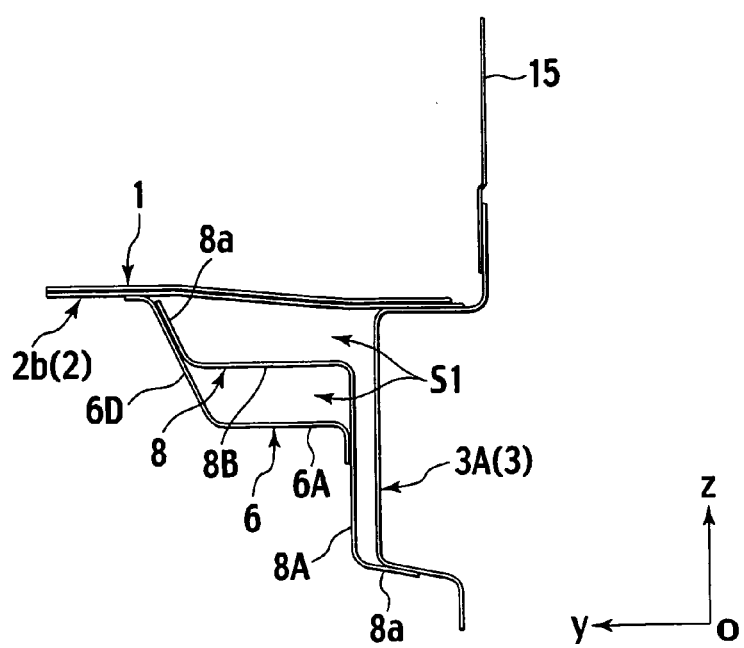
FIG. 6 is a cross-sectional view taken on line C—C of FIG. 3.

FIG. 1 is a schematic perspective view showing a vehicle body floor structure of an embodiment according to the present invention, under a condition wherein a dash panel, a gusset plate and a bolt plate are exploded, as viewed from a lower side of a vehicle body toward forward and upper side thereof, FIG. 2 is a schematic perspective view showing the vehicle body floor structure of the presently filed embodiment, under a condition where a floor reinforce and associated component parts are exploded, with assembled portion mainly between a front end of a side sill inner and a distal end of a cross member, that is, the cross member and associated component parts assembled to the vehicle body being viewed along a direction X, as shown in FIG. 1, which is oriented from an inner and lower side of the vehicle body toward an outer and upper side thereof, FIG. 3 is a perspective view showing the vehicle body floor structure of the presently filed embodiment in a condition where the floor reinforce and associated component parts, shown in the exploded form in FIG. 2, are assembled, FIG. 4 is a cross-sectional view taken on line A—A of FIG. 3, FIG. 5 is a cross-sectional view taken on line B—B of FIG. 3, and FIG. 6 is a cross-sectional view taken on line C—C of FIG. 3. Incidentally, in the drawing figures, an axis-x designates a forward direction of the vehicle body; a y-axis designates a leftward direction of the vehicle body; and a z-axis designates an upward direction of the vehicle body, with these axes forming a three-axis rectangular coordinate system.

As shown in FIG. 1, with a vehicle body floor structure S of the presently filed embodiment, a floor panel 1, shown in a phantom line for the sake of convenience, has a front end connected to a dash panel 2.

More particularly, the dash panel 2 is formed of a vertical wall 2a, slanted toe board sections 2b, contiguous with a lower area of the vertical wall 2a, and a tunnel section 2c at a center in a vehicle-widthwise direction, with a front end of the floor panel 1 being overlapped on rear ends of the toe board sections 2b and the tunnel section 2c.

Also as shown in FIG. 2, further, disposed beneath a lower surface of the floor panel 1 and extending in a fore and aft direction of the vehicle body on both sides thereof in the vehicle-widthwise direction are a pair of side sills 3 (shown in a phantom line in FIG. 1 for the sake of convenience), each formed in a closed cross-sectional configuration, with each side sill 3 having a side sill inner 3A serving as a structural member at an inside area in the vehicle-widthwise direction.

Joined to the lower surface of the floor panel 1 at an area close proximity to a junction between the floor panel 1 and the dash panel 2 is a cross member 4 that is connected to the side sill inners 3A of the pair of side sills 3, respectively, with the floor panel 1 and the cross member 4 forming a closed cross-sectional configuration extending in the vehicle-widthwise direction. Of course, the cross member 4 may include two-piece members that are connected to the center tunnel (not shown) of the floor panel 1, which is connected to the tunnel section 2c of the dash panel 2, respectively.

More particularly, as shown in FIGS. 2 and 3, the cross member 4 has a substantially hat-shaped cross-section formed of a bottom wall 4a, front walls 4b formed in opposition to one another, a rear wall 4c and flanges 4d bent and formed at upper edges of the front wall 4b and the rear wall 4c, respectively. That is, the cross member 4 is joined to the lower surface of the floor panel 1 at the flanges 4d, respectively, and has flanges 4d', which is formed at distal ends of the bottom wall 4a to be contiguous with the respective flanges 4d of the relevant front walls 4b, joined to the side sill inners 3A, respectively, with an upper area of the cross member 4 being closed with the floor panel 1 while both ends of the cross member 4 in the vehicle-widthwise direction are closed with the side sill inners 3A, respectively.

Further, the bottom wall 4a of the cross member 4 is formed in step portions extending toward both ends of the bottom wall 4 in the vehicle-widthwise direction and oriented downward such that the closed cross-sectional sections are enlarged. Particularly, as shown in FIG. 4, the cross member 4 is formed in substantial L-shape, in cross-section with the rear wall 4c being removed, at areas of the cross member 4 whose closed cross-sectional sections are enlarged.

By the way, mainly as shown in FIGS. 1 to 3, each gusset plates 5 is joined to a front end wall of each side sill inner 3A and a front face of the dash panel 2 at a side end thereof, thereby reinforcing the vehicle body floor structure.

As mainly shown in FIGS. 2 to 4 and FIG. 6, additionally, in a front corner area surrounded by the dash panel 2, a front end portion of the side sill inner 3A and the front wall 4b of the cross member 4 at the distal end thereof in the vehicle-widthwise direction, the dash panel 2, a floor reinforce 6 is joined to and placed on the dash panel 2, the side sill inner 3A and the cross member 4, thereby a front corner closed cross-sectional section S1.

In particular, the floor reinforce 6 is formed in a substantial L-shape in cross-section defined by a bottom wall 6A, a side wall 6B placed inward in the vehicle-widthwise direction, a front wall 6C and a tilt wall 6D through which the side wall 6B and the front wall 6C are interconnected.

The floor reinforce 6 is fixed in place such that the bottom wall 6A is joined to an outer surface of the bottom wall 4a of the cross member 4 and the front wall 6C is fixedly secured to the gusset plate 5 by fastening a bolt 10a via a bolt insertion hole 6a and a threaded bore 5a of the gusset plate 5 after which an upper edge flange 6C' is overlapped on and joined to a front face of the toe board 2b of the dash panel 2. Additionally, the floor reinforce 6 is fixed in place such that nuts 11a, 11b are fastened to bolts 7a, 7b provided on the bolt plate 7, which is joined to and placed beneath a lower surface of the toe board section 2b, via bolt insertion holes 6b, 6c formed in a wall portion of the tilt wall 6D and the upper edge flange 6D', respectively.

Further, as mainly shown in FIGS. 2 to 4 and FIG. 6, provided in the front corner closed cross-sectional section S1 is a rib wall 8 by which the front corner closed cross-sectional section S1 is vertically defined in plural chambers, more particularly, in two chambers.

More particularly, the rib wall 8 is formed in a substantial L-shape in cross-section with a vertical wall 8A, extending along a side face of the side sill inner 3A, and a transverse rib wall 8B bent from and formed at an upper end of the vertical wall 8A in a substantially horizontal plane. The transverse rib wall 8B has a flange 8a bent and formed such that the flange 8a is formed in a tilt configuration in conformity to a tilted shape of the tilt wall 6D of the floor reinforce 6 and continuously extending from straddling a lower edge of the vertical wall 8A, a front edge of the transverse rib wall 8B and a side edge of the transverse rib wall 8B.

The rib 8 is assembled such that the flanges 8a, formed at the lower edge and front edge of the vertical wall 8A, are preliminarily held in contact with a lower surface of the side sill inner 3A and the front face of the gusset plate 5 after which the flange 8a is fixedly secured to the gusset plate 5 by fastening a bolt 10b to a threaded bore 5b, formed in a lower area of the gusset plate 5, via a bolt insertion hole 8b formed in the flange 8a at a lower area thereof. In addition, during assembling the floor reinforce 6, the rib wall 8 is placed so as to allow the bolt 7a, provided on the bolt plate 7, to be inserted through a bolt insertion hole 8c, formed in the flange 8a at the upper edge of the rib wall 8B, upon which both the flange 8a of the rib wall 8 and the tilt wall 6D of the floor reinforce 6 are tightened together in a fixed place by fastening the nut 11a to the bolt 7a. Under an assembled status, therefore, a rear edge of the rib wall 8 is brought into abutment with or close contact with the front wall 4b of the cross member 4, thereby vertically defining the front corner closed cross-sectional section S1 in the two chambers.

Further, as mainly shown in FIGS. 2 to 4, formed in an area on a substantially rearward extension of the front corner closed cross-sectional section S1 at a rear corner area surrounded by the rear wall 4c at the distal end of the cross member 4, the side sill inner 3A and the floor panel 1 is a rear corner closed cross-sectional section S2 in which a floor reinforce extension 12 is joined to the side sill inner 3A and the floor panel 1, with the floor reinforce extension 12 straddling the cross member 4, the side sill inner 3A and the floor panel 1.

More particularly, the floor reinforce extension 12 is formed in a box-like configuration so as to cover an area, from which the rear wall 4c is cut away at the distal end of the cross member 4, with a bottom wall 12a and a front wall 12b of the floor reinforce 12 being joined to the bottom wall 4a and an inner surface of the front wall 4b of the cross member 4 such that the floor reinforce 12 partly overlaps on the cross member 4.

As mainly shown in FIGS. 4 and 5, joined to and placed on an inner surface of the bottom wall 12a is a nut plate 25, having a substantial U-shape cross-section, provided with a body-mounting nut 24 that will be described later. Moreover, the gusset plate 13 having a substantial U-shape cross-section is joined to and placed on the nut plate 25 and a rear wall 12c of the floor reinforce 12 in a way to straddle these component parts, thereby compensating a decrease in rigidity of the cross member 4 caused by cutting out the rear wall 4c at the ends of the cross member 4.

As mainly shown in FIG. 5, with the presently filed embodiment, a vehicle body of the type, having a cabin body CB formed with a vehicle compartment C, is mounted on the chassis frames 20 and has mount brackets 21 each throwing out to and joined to a side portion of each chassis frame 20. Attached on the mount bracket 21 is an insulator 22 that is held in abutting engagement with a lower side of overlapped portions among the bottom wall 4a of the cross member 4, the bottom wall 6A of the floor reinforce 6, and the bottom wall 12a of the floor reinforce extension 12, after which the insulator 22 is tightened to and fixed in place on the floor reinforce extension 12 by fastening a body mount bolt 23 and nut 24, thereby allowing the cabin body to be mounted on the chassis frames 20.

In the meanwhile, mainly as shown in FIG. 4, joined to and placed on the toe board 2b of the dash panel 2 on a side facing the vehicle compartment C is a foot rest 14 formed in a box-like configuration at an area directly above the front corner closed cross-sectional section S1 to form a vehicle compartment-side closed cross-sectional section S3 that is located substantially and directly above the front corner closed cross-sectional section S1.

Incidentally, in FIGS. 5 and 6, reference numeral 15 designates a dash side panel connected to the dash panel 2 and the side sills 3.

As set forth above, with the vehicle body floor structure of the presently filed embodiment, the floor reinforce 6 straddles and is joined to the front ends of the side sill inners 3A, the distal ends of the cross member 4 in the vehicle-widthwise direction and the dash panel 2, thereby forming the front corner closed cross-sectional sections S1. For this reason, even when the vehicle body encounters an impact input directed rearward from the front end of the side sill or directed inward in the vehicle-widthwise direction during a frontal collision of the vehicle, the front corner closed cross-sectional section S1 is able to ensure an adequate withstand resistance with the resultant improvement in a load dispersion effect on the floor reinforce 6, the cross member 4 and the dash panel 2, thereby enabling the minimization in deformations of the front ends of the side sills 3 to ensure a living space in front of the cabin.

Further, the presence of a layout partially provided with the floor reinforces 6 results in increases in rigidities of the front corner sections surrounded by the front wall 4b of the cross member 4, the front end portions of the side sill inners 3A and the dash panel 2, enabling further advantageous effects to result in weight and cost than those obtained upon entirely increasing a plate thickness or a material quality of the side sills 3.

Further, due to the presence of the rib wall 8 disposed in the front corner closed cross-sectional section S1 to allow the same to be vertically defined in plural spaces, the front corner closed cross-sectional section S1 is enabled to have further increased strength and rigidity.

Of course, the rib wall 8 may include plural wall components by which the front corner closed cross-sectional section S1 is divided into a plurality of spaced in the vehicle-widthwise direction to enable improved rigidity to be obtained.

Further, due to a structure wherein the front reinforce extension 12 straddles and is joined to the rear corner section, surrounded by the rear wall 4c of the cross member 4 at the end thereof in the vehicle-widthwise direction, the side sill inner 3A and the floor panel 1 upon which the rear corner closed cross-sectional section S2 is defined on an extension substantially rearward of the front corner closed cross-sectional section S1, an area around the front end of the side sill 3 has further increased strength and rigidity in the fore and aft direction and in the vehicle-widthwise direction.

Also, since the box-like foot rest 14 is joined to and placed on the toe board 2b of the dash panel 2 on the side facing the vehicle compartment thereby forming the closed cross-sectional sections S3 on a side facing the vehicle compartment in the area directly above the front corner closed cross-sectional section S1, the area around the front end of the side sill 3 has further increased strength and rigidity, enabling a deformation and ingression stroke of the dash side portion, oriented toward the vehicle compartment during a frontal collision of the vehicle, to be minimized to a value as less as possible.

Incidentally, while the presently filed embodiment has been described taking the vehicle of the type in which the cabin body is mounted on the chassis frames 20 as an example, it is, of course, to be noted that the present invention may have application to a vehicle with a monocoque body construction.

The entire content of a Patent Application No. TOKUGAN 2004-137198 with a filing date of May 6, 2004 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A vehicle body floor structure comprising:
 a cross member connected to at least one of a pair of side sill inners, extending in a fore and aft direction of a vehicle body at both ends of the cross member in a widthwise direction of the vehicle body, and associated with a lower surface of a front end of a floor panel at an area close proximity to a dash panel to form a closed cross-sectional section extending in the widthwise direction; and
 a floor reinforce joined to the dash panel, the side sill inner and the cross member at a front corner area surrounded by the dash panel, a front end of the at least one of the side sill inners, and a front wall of the end of the cross member to form a front corner closed cross-sectional section.

2. The vehicle body floor structure according to claim 1, wherein the floor reinforce is fixed to a gusset plate that is joined to a front face of a side end of the dash panel and a front end wall of the side sill inner in an area straddling the same.

3. The vehicle body floor structure according to claim 1, wherein the floor reinforce is fixed to the cross member via a mount fixing structure.

4. The vehicle body floor structure according to claim 1, wherein the floor reinforce is fixed to the dash panel via a bolt plate fixed to the dash panel.

5. The vehicle body floor structure according to claim 1, wherein the floor reinforce has an L-shape in cross-section.

6. The vehicle body floor structure according to claim 1, further comprising a rib wall disposed in the front corner closed cross-sectional section for defining a plurality of spaces in at least one of a vertical direction of the vehicle body and the widthwise direction thereof.

7. The vehicle body floor structure according to claim 1, further comprising a floor reinforce extension, joined to the cross member, the at least one of the side sill inners and the floor panel at a rear corner area surrounded by a terminal rear wall of the cross member, the at least one side sill inner and the floor panel, the floor reinforce extension forming a rear corner closed cross-sectional section in an area rearward of the front corner closed cross-sectional section.

8. The vehicle body floor structure according to claim 7, wherein the floor reinforce extension covers a cutout portion of the cross member.

9. The vehicle body floor structure according to claim 7, wherein a mount fixing structure is attached to the floor reinforce extension and the cross member.

10. The vehicle body floor structure according to claim 1, further comprising a box-like foot rest, joined to and fixed on a surface, facing a vehicle compartment, of the dash panel, the box-like foot rest forming a compartment sided closed cross-sectional section directly above the front corner closed cross-sectional section.

* * * * *